United States Patent [19]

Walker et al.

[11] 4,311,951
[45] Jan. 19, 1982

[54] APPARATUS AND METHOD FOR HIGH SLIP OPERATION OF AN AC ELECTRIC MOTOR AT SUBSTANTIALLY ZERO ROTATION AND SUBSTANTIALLY ZERO TORQUE

[75] Inventors: Loren H. Walker, Salem; John H. Cutler, Roanoke, both of Va.

[73] Assignee: General Electric Company, Salem, Va.

[21] Appl. No.: 32,899

[22] Filed: Apr. 24, 1979

[51] Int. Cl.³ .............................................. H02P 1/26
[52] U.S. Cl. .................................. 318/778; 318/430; 318/436; 318/803; 318/808
[58] Field of Search .............................. 318/798–803, 318/807–812, 445, 430, 436, 245, 332, 459, 474, 778; 363/42, 49

[56] References Cited
U.S. PATENT DOCUMENTS

| | | | |
|---|---|---|---|
| 3,696,278 | 10/1972 | Kuniyoshi et al. | 318/778 |
| 3,787,724 | 1/1974 | Pedersen et al. | 318/778 |
| 4,002,959 | 1/1977 | Schadlich et al. | 318/245 |
| 4,151,586 | 4/1979 | Uduardi-Lakos | 363/57 |
| 4,195,233 | 3/1980 | Uduardi-Lakos | 307/66 |

Primary Examiner—David Smith, Jr.
Assistant Examiner—John B. Conklin
Attorney, Agent, or Firm—Arnold E. Renner

[57] ABSTRACT

Apparatus and method for high slip operation of an AC electric motor at substantially zero rotation and substantially zero torque in an AC electric motor drive system is disclosed. The electric motor produces a rotation in response to an outgoing signal, such as a drive current, of variable magnitude and frequency supplied by the drive system. An idle control signal is furnished when the drive system is in a substantially zero rotation and substantially zero torque state, where the frequency of the current is approximately zero. The idle control signal causes substantially simultaneously an adjustment of the magnitude of the current to a predetermined magnitude level and a rapid raising of the frequency of the current to a higher frequency value to produce per-unit slip $s=(n_1-n)/n_b$ greater than 0.1, where $n_1$ is the synchronous rotation of the stator field of the motor, n is the rotation of the rotor of the motor, and $n_b$ is the synchronous speed of the stator field at motor rated rpm. The adjustment in the magnitude and the rapid increase in the frequency of the current causes the motor to produce substantially zero rotation and substantially zero torque because the motor is operating in the high slip region of its torque-rotation curve. The apparatus and method of the present invention allows the motor to accelerate rapidly on command from the substantially zero rotation and substantially zero torque high slip mode.

29 Claims, 9 Drawing Figures

(CONSTANT SLIP OPERATION)

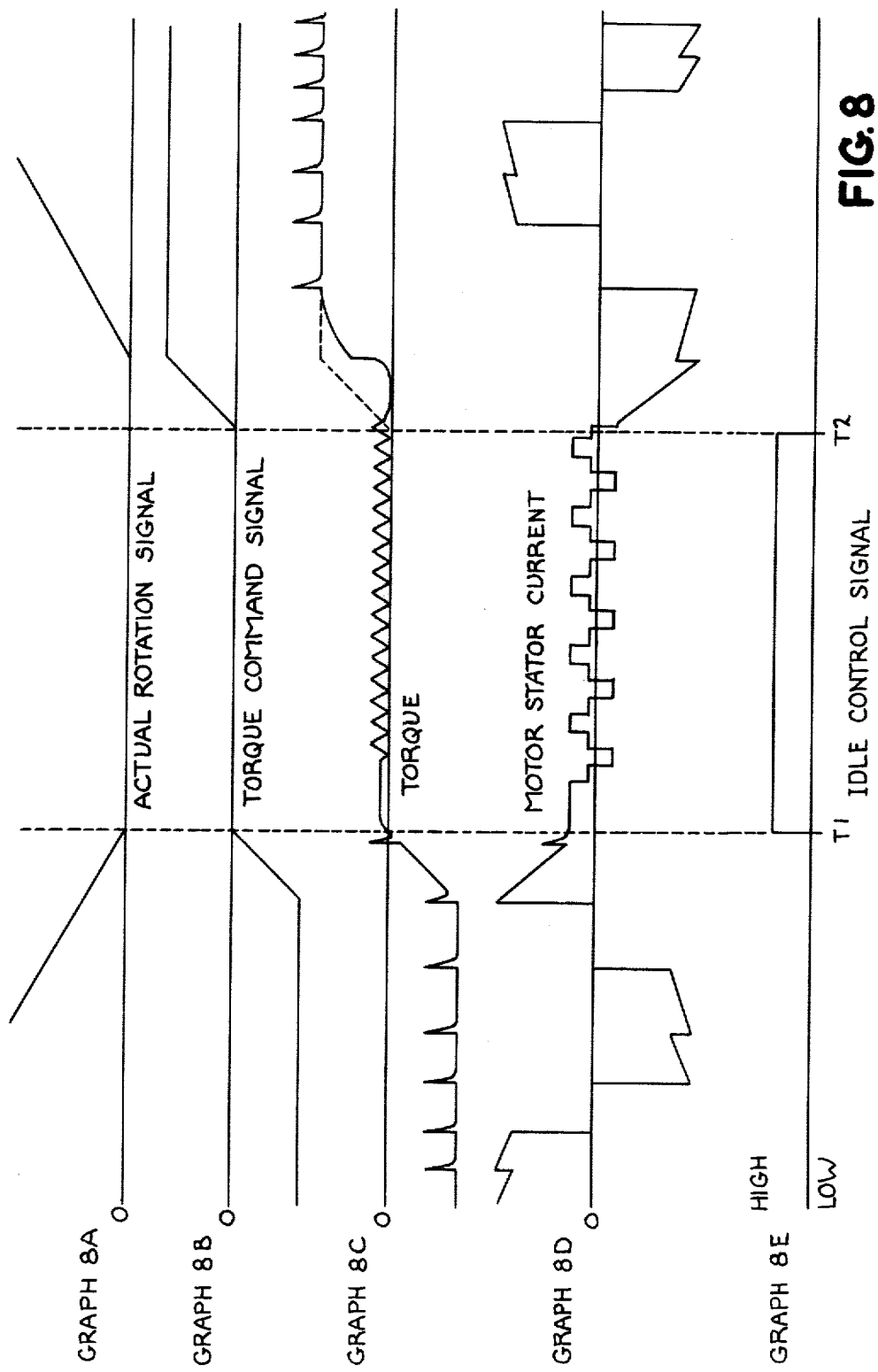

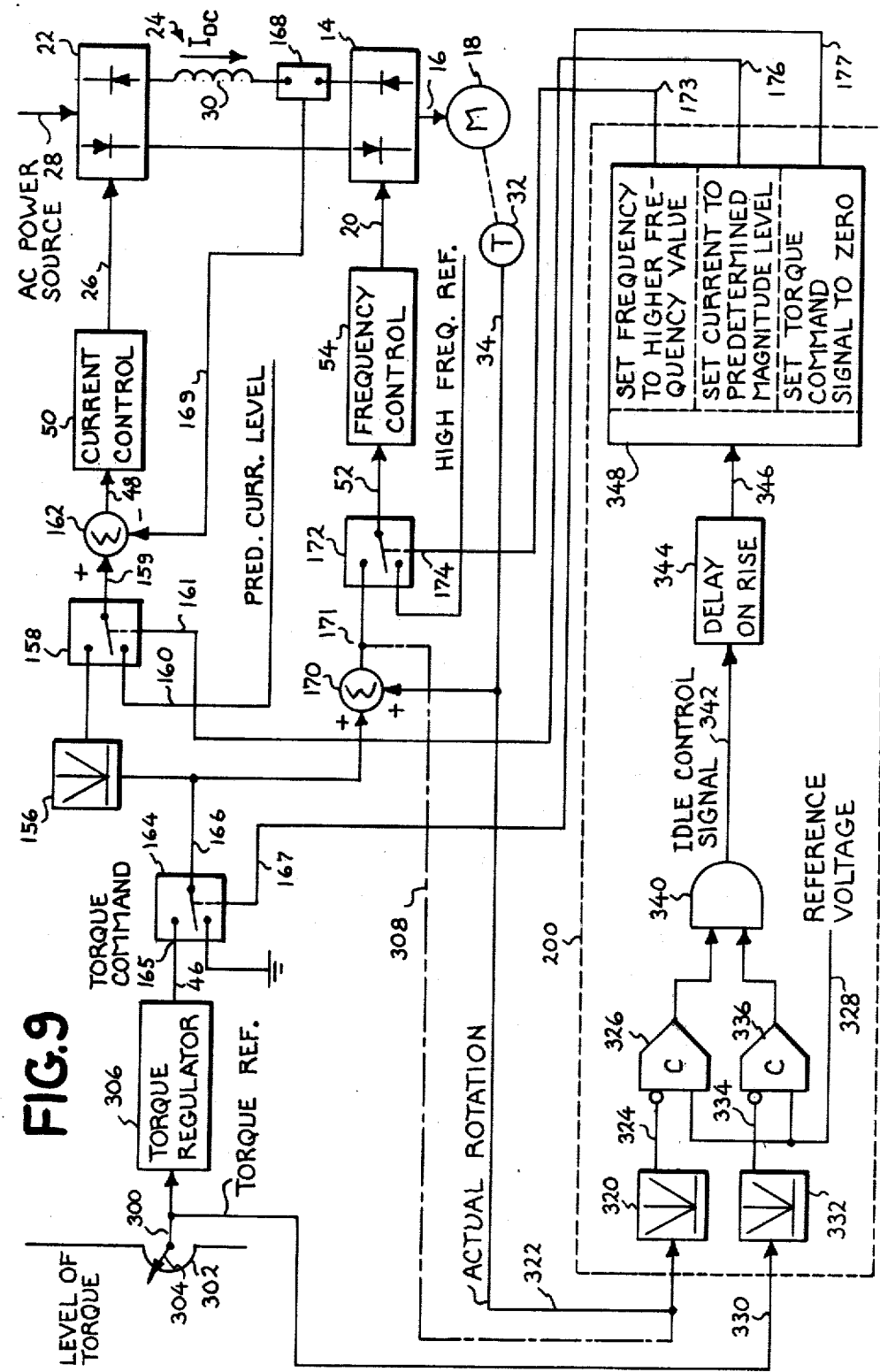

APPARATUS AND METHOD FOR HIGH SLIP OPERATION OF AN AC ELECTRIC MOTOR AT SUBSTANTIALLY ZERO ROTATION AND SUBSTANTIALLY ZERO TORQUE

BACKGROUND OF THE INVENTION

1. Field Of The Invention

The present invention relates generally to AC drive power conversion systems and, more particularly, to an apparatus and method for high slip operation of an AC electric motor at substantially zero rotation and substantially zero torque, which electric motor being supplied an outgoing signal, such as a drive current, of variable magnitude and frequency by an AC electric motor drive system.

2. Prior Art

Direct current (DC) motors have traditionally been used in electric drive systems to produce a mechanical rotation over a variable rotation range at substantial torque levels. However, DC motors exhibit several major deficiencies, including high maintenance costs and radio frequency interference problems caused by arcing and concomitant mechanical deterioration of the brushes used in such motors.

The trend in recent years has been to use AC motors in electric drive systems which produce variable mechanical rotation of substantial torque. AC motors are attractive technically and commercially because of their lack of brushes and inherent ruggedness of design.

An excellent analysis of the theory and operation as well as the attributes and deficiencies of DC and AC motor types is found in *Electrical Mechinery, the Processes, Devices and Systems of Electromechanical Energy Conversion*, 3d Ed., by A. E. Fitzgerald et al, McGraw-Hill Book Company, New York, 1971.

One type of AC motor is the AC induction motor. The AC induction motor has been used in AC drive power systems for producing a variable mechanical rotation of substantial torque.

In such drive systems, the AC induction motor produces a variable mechanical rotation of variable torque in response to an outgoing signal, such as a drive current, of variable magnitude and frequency. This drive current typically is supplied from a variable frequency inverter. The inverter converts a DC current of controllable magnitude into the drive current of variable magnitude and frequency; in the case of the thyristor inverter, the drive current is generated as a result of controlled gating of the thyristors. The inverter typically has commutating capacitors used to commutate automatically the thyristors. This automatic commutation produced by the commutating capacitors requires, however, a charge of appropriate magnitude and polarity on each commutating capacitor.

The DC current of controllable magnitude provided to the inverter can be supplied from any DC current source, but typically is provided by a DC converter via a DC link having an inductor.

A conventional drive system utilizing an AC induction motor typically can provide substantially zero rotation at substantial torque. One way this can be accomplished is by operating the induction motor in a "constant slip" mode. The concept of slip is explained in detail below, but it is sufficient for present purposes to state that per-unit slip s is expressed as $s = (n_f - n)/n_b$, where n is the rotation produced by the rotor of the motor in revolutions per minutes (rpm), $n_f$ is the synchronous rotation of the stator field of the motor in rpm, and $n_b$ is the synchronous speed of the stator field at motor rated rpm. In this regard, reference is made to pages 188-89 of the Fitzgerald, et al reference presented above.

When the drive system produces zero rotation at substantial torque by operating the induction motor in a constant slip mode, the amount of generated torque is controlled by varying the magnitude of the drive current. To produce the substantial torque, the per-unit slip must have a very low value, for example, 0.02, in order to operate the induction motor in the required region of its torque-slip curve.

Rapid acceleration of the motor rotor out of the zero rotation, substantial torque mode is possible for three reasons. First, a sufficient charge of proper polarity is maintained on each commutating capacitor because the frequency of the drive current is very low, for example, 1 to 2 Hertz (Hz), but is not 0 Hz, and the magnitude of the drive current is high. Secondly, the flux level in the motor needed to generate torque is high due to the high magnitude of the drive current. Lastly, the magnitude of the current flowing through inductor of the DC link is already high, thus not requiring a substantial rate of change of current.

Conventionally, when it is desired to operate the AC induction motor in the substantially zero rotation and substantially zero torque mode, the magnitude and frequency of the drive current are reduced substantially to zero values. This results in several problems in system performance. In high performance drive systems, it is essential that the AC induction motor be able to accelerate rapidly on command from the substantially zero rotation and substantially zero torque condition. However, this rapid acceleration is not presently possible in existing AC electric motor drive systems because of two inherent problems.

First, in order to produce substantially zero rotation and substantially zero torque, the frequency of the drive current must be at a very low value, typically zero Hz. This is shown by FIG. 4, which plots slip on the vertical axis with respect to torque on the horizontal axis. This low frequency value, however, causes the requisite charge on the commutating capacitors to bleed off because the inverter is not being commutated. The insufficient charge on the commutating capacitors results in unsatisfactory commutation when the drive system is rapidly taken out of the substantially zero rotation and substantially zero torque condition.

The second problem is that the required reduction in the magnitude of the drive current causes the level of the DC current in the DC link connecting the inverter with the DC current source to be at a low level. As stated above, the DC link typically includes an inductor connected in series between the DC current source and the inverter. As is well known, the current through an inductor cannot be changed instantaneously; instead, a finite amount of time is required to raise substantially the level of the current flowing through the inductor. Thus, a time delay is also introduced in a conventional system when the system is taken out of the substantially zero rotation and substantially zero torque condition due to the inductor in the DC link.

OBJECTS OF THE INVENTION

It is an object of the present invention to provide an apparatus and method for operating an induction motor at high slip to produce substantially zero rotation and substantially zero torque.

It is a further object of the present invention to provide an apparatus and method for furnishing an idle control signal when the AC electric motor drive system is in a substantially zero rotation and substantially zero torque mode, where the magnitude and frequency of the drive current are each substantially zero, and for changing in response to the idle control signal the magnitude and frequency of the outgoing signal, such as a drive current, supplied to the induction motor by the AC electric motor drive system.

It is another object of the present invention to provide an apparatus and method for substantially simultaneously rapidly changing the magnitude of the drive current to a predetermined magnitude level and for raising rapidly the frequency of the drive current to a higher frequency value when the idle control signal is furnished in order to produce a per-unit slip s greater than 0.1.

It is a further object of the present invention to provide an apparatus and method for substantially simultaneously changing rapidly the magnitude of the drive current and rapidly raising the frequency of the drive current when the idle control signal is present so that the motor is operating in the high slip region of its torque-rotation curve and the rotation and torque produced by the motor are substantially zero.

These and other objects have been achieved by the apparatus and method of the present invention.

SUMMARY OF THE INVENTION

An apparatus and method for high slip operation of an AC electric motor at substantially zero rotation and substantially zero torque is disclosed. The motor is supplied an outgoing signal, such as a drive current, of variable magnitude and frequency from an inverter circuit. The drive system generates an actual rotational signal proportional to the rotation produced by the motor or in accordance with the frequency of the drive current. A rotation reference signal is established proportional to a desired level of rotation. A rotation difference signal is generated as a function of any difference between the rotation reference signal and the actual rotation signal. A torque command signal is provided in accordance with the rotation difference signal. Alternately, the drive system can establish a torque reference signal proportional to a desired level of torque, and can generate the torque command signal as a function of the torque reference signal. In either case, the torque command signal is used as a function to produce a frequency control signal and a current control signal. An inverter supplies to the motor the outgoing signal, such as the drive current, at a frequency controlled in response to the frequency control signal and at a magnitude varied in accordance with the current control signal.

A substantially zero rotation and substantially zero torque mode where the magnitude and frequency of the drive current are each substantially zero is indicated when an idle control signal is furnished. In the version of the drive system employing a desired level of rotation, the idle control signal is furnished when the torque command signal and at least two of the rotation reference signal, the actual rotation signal, and the rotation difference signal are less than respective predetermined values. In the version of the drive system employing a desired level of torque, the idle control signal is supplied when the actual rotation signal and the torque command signal are less than respective predetermined values, or, alternately, when the actual rotation signal and the torque reference signal are less than respective predetermined values.

The apparatus and method of the present invention substantially simultaneously rapidly changes the magnitude of the drive current to a predetermined magnitude level and rapidly raises the frequency of the drive current to a higher frequency value when the idle control signal is present. The higher frequency value is selected to produce a per-unit slip s greater than 0.1, and the predetermined magnitude level is chosen to maintain the current in the motor at a desired level. The rapid change in the magnitude of the drive current and the rapid increase in the frequency of the drive current causes the motor to produce substantially zero rotation and substantially zero torque because it is being operated in the high slip region of its torque-slip curve.

BRIEF DESCRIPTION OF THE DRAWINGS

FIG. 8 includes five separate graphs plotting identical time periods on horizontal axes, and plotting on vertical axes, respectively, the levels of the actual rotation signal, the torque command signal, the torque, the motor stator current, and the idle control signal as the drive system enters, stops, and then exits the high slip substantially zero rotation and substantially zero torque mode in accordance with the apparatus and method of the present invention.

FIG. 9 is a schematic block diagram of a preferred embodiment of the apparatus and method for high slip operation of an AC electric motor at substantially zero rotation and substantially zero torque utilized in an AC electric motor drive system employing a desired level of torque.

DETAILED DESCRIPTION OF THE INVENTION

Figure 1:
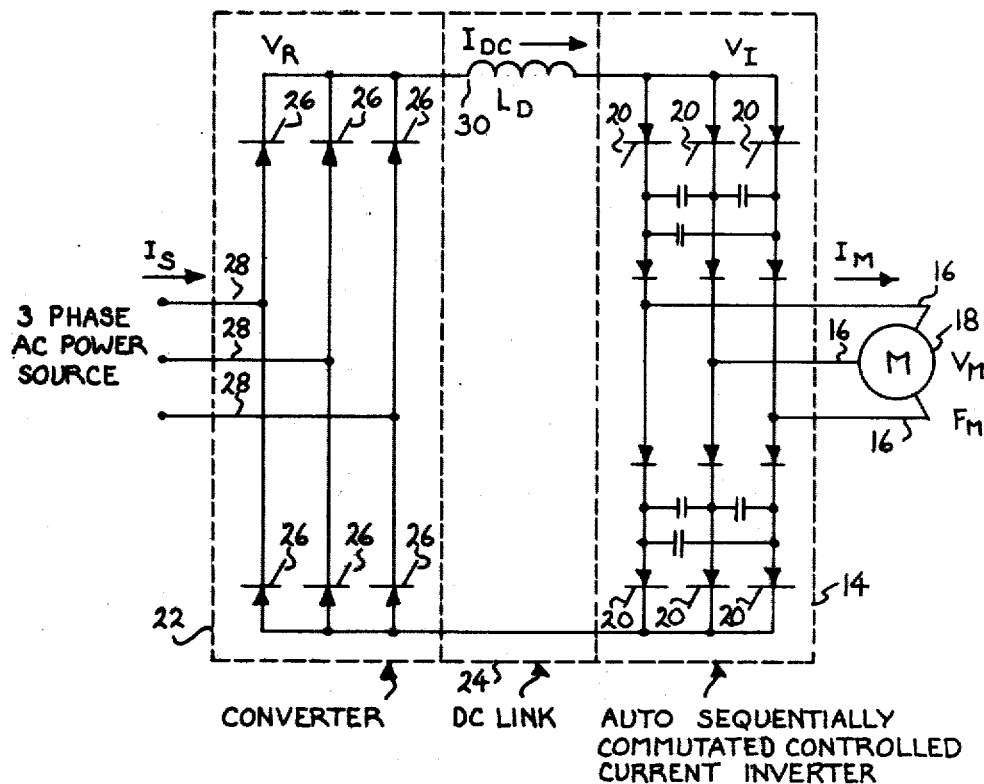
FIG. 1 is a schematic diagram of an exemplary motor drive system comprising a three-phase AC power source, converter, DC link, and autosequentially commutated controlled current inverter coupled to an AC electric motor suitable for use with the apparatus and method of the present invention.
Figure 2:
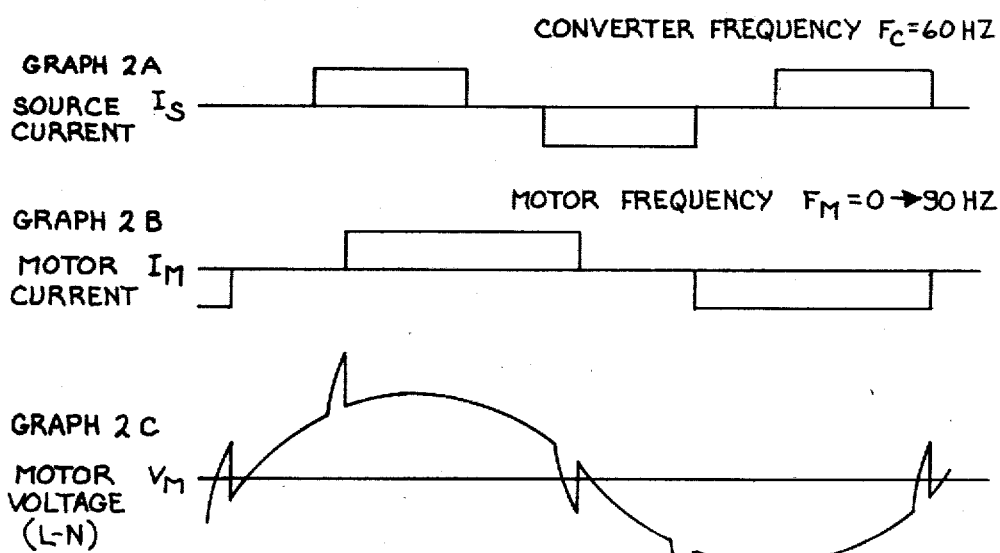
FIG. 2 plots on graphs 2A, 2B and 2C, respectively, the magnitude of the source current $I_S$, the motor current $I_M$, and the motor voltage (L−N) on the respective vertical axes with respect to time on the horizontal axes for the converter, DC link, and inverter of FIG. 1.
Figure 3:
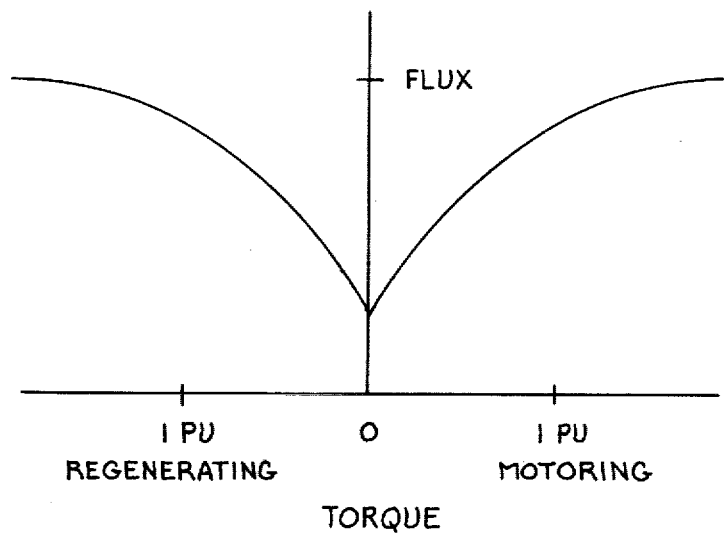
FIG. 3 plots flux on the vertical axis versus torque on the horizontal axis of the motor for the constant slip mode of operation.

FIG. 1 is a schematic diagram of a typical three-phase AC power source converter 22, DC link 24, and autosequentially commutated controlled current inverter 14 in an AC electric motor drive system employing an AC electric motor 18. FIG. 2 plots on graphs 2A, 2B and 2C, respectively, on vertical axes the magnitude of the source current $I_S$, the motor current $I_M$, and the motor voltage (L−N) with respect to time on the horizontal axes for the converter 22 and inverter 14 of FIG. 1.

As graphs 2A and 2B show, the frequency of the source current $I_S$ supplied by the AC power source 28 to converter 22 is substantially constant, for example, 60 Hz, whereas the motor or drive current $I_M$ of variable magnitude and frequency supplied by the autosequentially commutated controlled current inverter 14 can be varied from, for example, 0 to 90 Hz.

The rotation n produced by the rotor of the AC electric motor is varied in accordance with the frequency of the drive current $I_M$ and the amount of torque required to be produced.

The concept of slip of an AC induction motor is now defined. Rotation of the rotor is defined as being equal to n revolutions per minute (rpm), and the rotation of the stator field of the motor is defined as being equal to $n_f$ rpm; the rotation of the rotor and the stator field are assumed to be in the same direction.

The slip of the rotor is defined as being equal to $n_f - n$ rpm. Another way to look at it is that the slip is the difference between the value of rotation of the stator field and the value of rotation produced by the rotor. This relationship often is expressed as a per-unit slip s expressed as $s = (n_f - n)/n_b$, where n is the rotation produced by the rotor of the motor in rpm, $n_f$ is the synchronous speed of the stator field of the motor in rpm, and $n_b$ is the synchronous speed of the stator field at motor rated rpm. Thus, it is apparent that as the value of the per-unit slip s increases from 0 to 1, the value of the rotation n produced by the rotor decreases with respect to the rotation value $n_f$ of the stator field.

Figure 5:
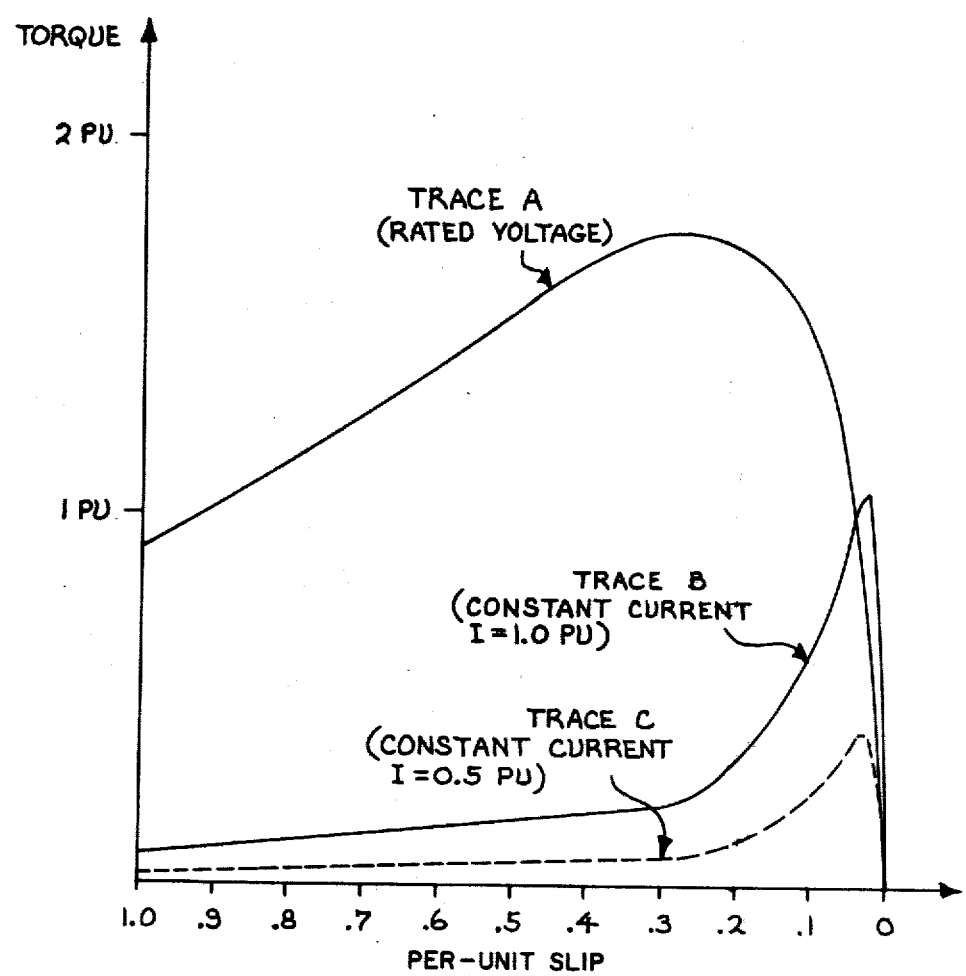
FIG. 5 plots torque in per unit (P.U.) on the vertical axis with respect to per-unit slip on the horizontal axis for torque-rotation curves produced by a conventional induction motor operated at fixed frequency, with trace A being the torque-rotation curve for rated drive voltage, with trace B being the torque-rotation curve for a constant drive current of I=1.0 P.U., and with trace C being the torque-rotation curve for a constant drive current of I=0.5 P.U.

FIG. 5 plots the value of torque on the vertical axis with respect to per-unit slip s on the horizontal axis for an AC induction motor excited at constant frequency for the condition where the motor is driven by a drive signal at rated voltage (trace A), by a drive current of a constant value at I = 1.0 per unit (P.U.) (trace B), and by a drive current of a constant value at I = 0.5 P.U. (trace C).

Trace A shows that in the case of a drive signal at rated voltage the torque produced by the motor first increases between per-unit slip values of 0 to 0.275 and then decreases at a substantially constant rate between per-unit slip values of 0.3 to 1.0.

Trace B shows that when the motor is provided with a drive current having a constant value of I = 1.0 P.U., torque increases rapidly between the per-unit slip values of 0 to 0.04, then decreases very rapidly between the per-unit slip values of 0.05 to 0.3, and then decreases at a much more gradual and constant rate between the per-unit slip values of 0.3 to 1.0.

Trace C plots the torque produced by the electric motor supplied with a drive current having a constant value of I = 0.5 P.U. Trace C shows that the torque produced by the motor with respect to per-unit slip is substantially similar to the torque produced by the motor plotted by trace B, with the exception that the torque level for each corresponding per-unit slip value is reduced approximately as the square of the value of the drive current. As is well known, there is a whole family of curves for drive currents from 1.0 P.U. to 0 P.U. between trace B and the horizontal axis of FIG. 5.

Conventional electric motor drive systems typically provide the desired amount of torque and rotation by maintaining a low value for the per-unit slip, for example, 0.01 to 0.03, and by varying the magnitude and/or frequency of the drive current.

Figure 4:
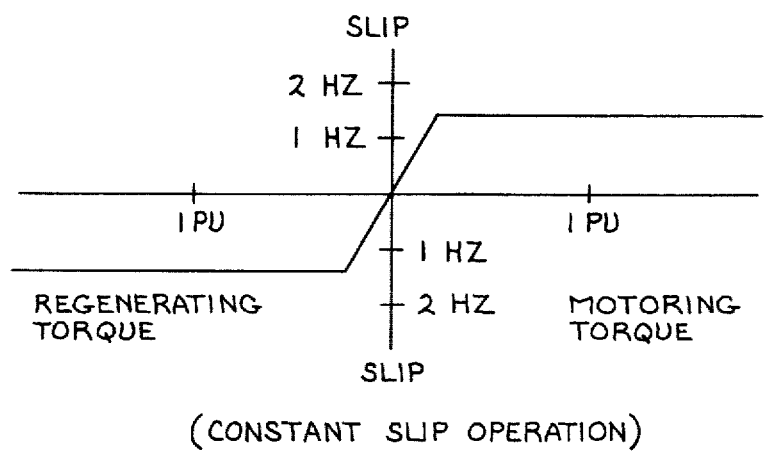
FIG. 4 plots on the vertical axis slip in Hertz (Hz) with respect to torque on the horizontal axis produced by a motor operating in the constant slip mode.
Figure 7:
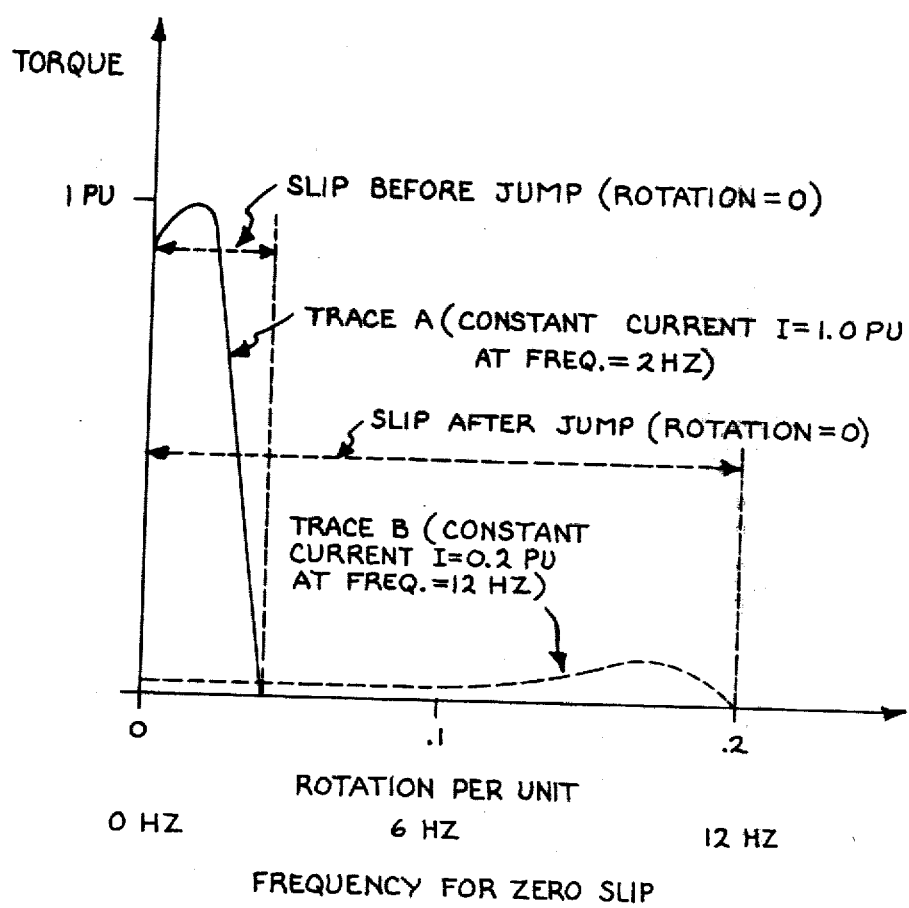
FIG. 7 plots torque on the vertical axis with respect to rotation on the horizontal axis of the torque-rotation curves of an induction motor, with trace A being the torque-rotation curve of the motor driven by a constant drive current I=1.0 P.U. to produce a high torque, substantially zero rotation condition, and with trace B being the torque-rotation curve of the motor driven by a constant current of I=0.2 P.U. and after a sudden jump in frequency of the motor drive current to produce high slip operation at substantially zero rotation and substantially zero torque in accordance with the apparatus and method of the present invention.

Trace A of FIG. 7 plots torque on the vertical axis versus rotation on the horizontal axis for the constant slip mode used in variable frequency electric motor drive systems to generate high torque at substantially zero rotation from the motor using a drive current of a high constant current value of I = 1.0 P.U., as was described above. As trace A shows, the rotation produced by the motor is substantially zero when a slip value of approximately 2 Hz is used. The use of constant slip for producing high torque at substantially zero rotation is also shown by the plot of FIG. 4.

As was discussed above, prior art variable frequency electric motor drive systems utilizing a controlled current inverter cannot produce a substantially zero rotation and substantially zero torque without detrimentally affecting the ability of the system to exit and accelerate rapidly out of this condition because the magnitude of the drive current in the constant slip mode must be reduced substantially to zero or the frequency of the inverter must be reduced to zero, causing the charge on the commutating capacitors to bleed off.

The apparatus and method of the present invention overcomes these deficiencies by operating the AC electric motor at high slip to produce substantially zero rotation and substantially zero torque. High slip operation allows the frequency of the drive current to be high enough to maintain desired charge on the commutating capacitors. In addition, it allows a higher magnitude for the drive current and still obtain the desired substantially zero rotation and substantially zero torque. Because the drive current can have a higher magnitude, the current flowing through the inductor of the DC link is also at a higher value. Thus, the apparatus and method of the present invention overcomes the two deficiencies discussed above which are present in conventional AC electric motor drive systems operating at substantially zero rotation and substantially zero torque.

The apparatus and method of the present invention is now described in summary form; preferred embodiments for implementing the present invention are presented in detail below.

The conventional electric motor drive system is brought into the conventional substantially zero rotation and substantially zero torque condition in response to a desired level of rotation or a desired level of torque. At this point, the drive system is providing drive current having substantially zero frequency. Immediately after this condition is achieved, however, the apparatus and method of the present invention causes substantially simultaneously the magnitude of the drive current to be changed to a predetermined magnitude level and the frequency to be rapidly raised to a higher frequency value so that the motor is operating at a per-unit slip greater than 0.1, as shown by trace B of FIG. 7. Because the motor is being supplied drive current having the current magnitude and per-unit slip shown by trace B of FIG. 7, a substantially zero rotation and substantially zero torque is produced. Thus, the apparatus and method of the present invention overcomes the deficiencies present in conventional systems by utilizing effectively the low torque produced by an AC induction motor provided with a drive current of substantial magnitude when the motor is operating in high per-unit slip.

Figure 6:
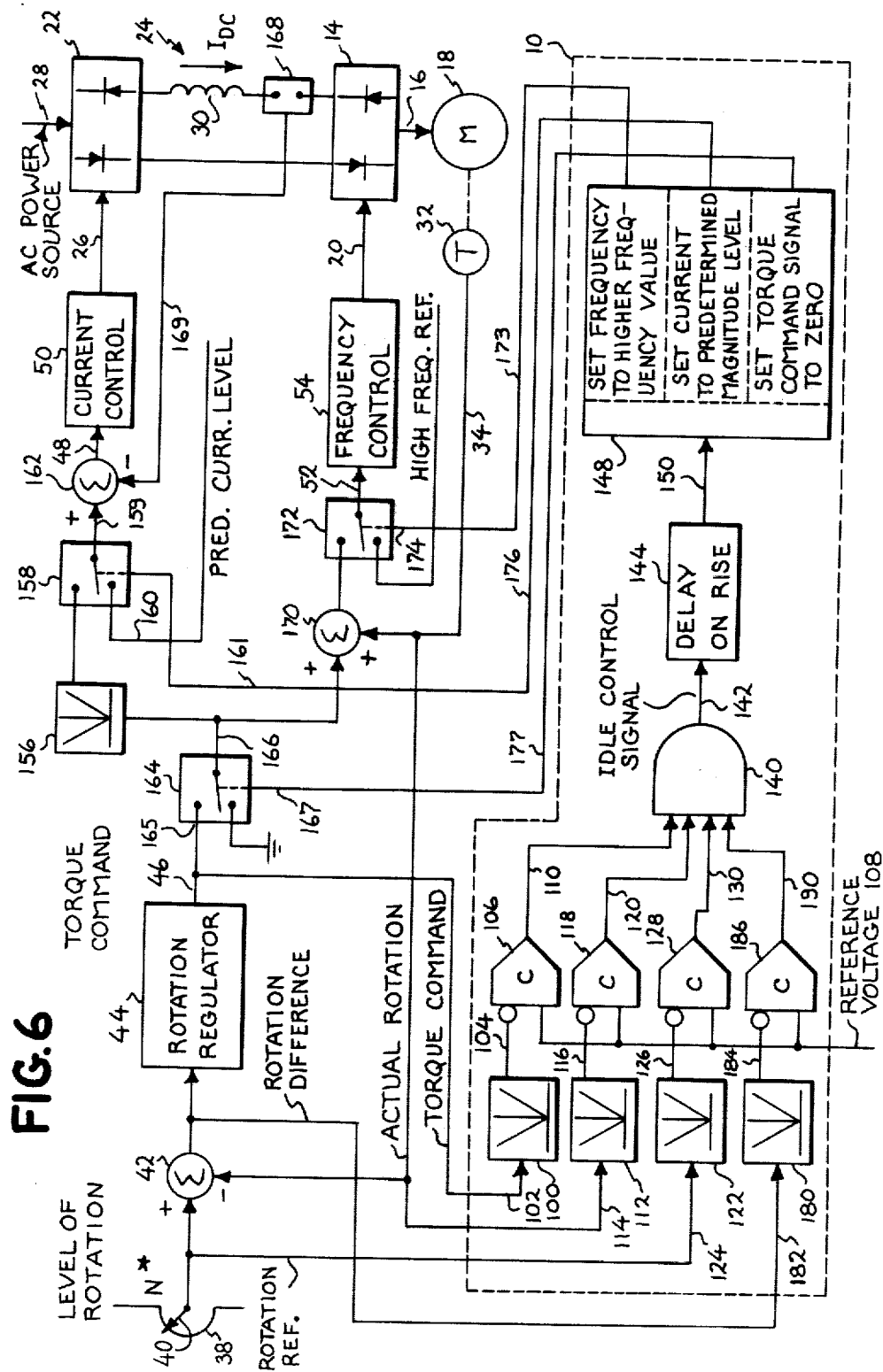
FIG. 6 is a schematic block diagram of a preferred embodiment of the apparatus and method for high slip operation of an AC electric motor at substantially zero rotation and substantially zero torque of the present invention utilized in an AC electric motor drive system employing a desired level of rotation.

Turning to FIG. 6, a schematic block diagram of a preferred embodiment of the apparatus for high slip operation of an AC electric motor at substantially zero rotation and substantially zero torque of the present invention utilized in an AC electric motor drive system employing a desired level of rotation is shown. The apparatus of the present invention is shown in a preferred embodiment basically within a dashed-line box 10; the circuitry outside box 10 is essentially a conventional AC electric motor drive system employing a desired level of rotation command.

The apparatus and method of the present invention can be utilized in other types of electric drive systems. The system shown in FIG. 6 is only for purposes of illustration, and is similar to the system disclosed and claimed in U.S. Pat. No. 4,230,979, entitled "Controlled Current Inverter and Motor Control System," to P. M. Espelage et al, issued Oct. 28, 1980, assigned to the assignee of the present invention and incorporated by reference herein. Another suitable electric drive motor system is shown in A. B. Plunkett, D'Atre, J. D., Lipo, T. A., "Synchronous Control of a Static AC Induction Motor Drive," *IEEE/IAS Annual Meeting Conference Record*, 1977, pp. 609-15.

Referring to FIG. 6, a variable frequency inverter 14 provides an outgoing signal, such as a drive current, of variable magnitude and frequency via a line 16 to a load, such as AC motor 18. AC motor 18 can be of any suitable type, but preferably is an AC induction motor.

Inverter 14 can be of any suitable type for converting a DC input signal to a drive current of variable frequency under control of a variable frequency gating signal, also referred to as a frequency control signal, on an input line 20. One preferable form for inverter 14 is an autosequentially commutated controlled current inverter having a 6-thyristor bridge, such as inverter 14 of FIG. 1, which generates the drive current of variable magnitude and frequency in accordance with the gating of the thyristors.

The DC input current to inverter 14 can be provided by any suitable variable DC current source. One preferred embodiment for the variable DC current source is a converter 22, which supplies variable magnitude DC current via a DC link 24 to the input of inverter 14. Converter 22 converts AC power supplied through terminals 28 under control of phase controlled gating signals on lines 26 to a DC current of variable magnitude. The phase controlled gating signals are also referred to herein as the current control signal. Converter 22 can be of any suitable type but, most typically, would be a 6-thyristor phase controlled converter whose thyristors are provided with gating pulses by the current control signal on line 26, as shown by converter 22 of FIG. 1.

The DC current of variable magnitude ($I_{DC}$) is provided to inverter 14 via DC link 24. DC link 24 can take any suitable form, but preferably includes an inductor 30 connected in series between converter 22 and inverter 14. Inductor 30 acts as a filter.

Thus, the magnitude of the drive current supplied by inverter 14 to line 16 is controlled by the current control signal supplied to converter 22, and the frequency of the drive current is varied in accordance with the frequency control signal furnished on line 20 to inverter 14.

The electric motor drive system shown in FIG. 6 is a closed loop system having the following feedback paths. The actual rotation produced by motor 18 is sensed and used to generate an actual rotation signal on a line 34 proportional to the mechanical rotation. One suitable form for generating the actual rotation signal is a DC tachometer 32. Another approach for generating the actual rotation signal is by sensing the frequency of the drive current. Furthermore, other approaches for generating the actual rotation signal are contemplated by this invention.

A desired level of rotation is used to establish a rotation reference signal proportional thereto. The desired level of rotation can be furnished from either a system or user command; and most typically is in the form of a rotation user command from an operator settable rheostat 38 having a wiper arm 40 connected to a user or operator rotation control level (not shown).

The rotation reference signal from wiper arm 40 is provided to a first input of a summing junction 42. The actual rotation signal is negatively fed back and provided to a second input of summing junction 42. The output of summing junction 42 is a rotation difference signal, which is representative of any difference between the rotation reference signal and the actual rotation signal and is provided to the input of a rotation regulator 44. Rotation regulator 44 can be of any suitable type to generate on a line 46 a torque command signal as a function of the rotation difference signal. One suitable form for rotation regulator 44 is an operational amplifier configured to operate as a gain amplifier having, for example, a transfer function of $k(1+st)/s$, where s is a LaPlace operator, t is a time constant, and k is a gain constant.

Line 46 is connected to the input 165 of an electronic switch 164. As is discussed below, electronic switch 164 is part of the present invention. Electronic switch 164 is adopted to connect its output 166 effectively to electrical ground in response to a switching signal or idle control signal applied to a switching input 167 so as to cause the torque command signal effectively to assume a substantially zero value. Electronic switch 164 can be of any suitable type, such as a bipolar transistor or field effect transistor switch or an electromechanical relay.

The torque command signal is applied via line 46 to the input of an absolute value stage 156 of conventional design. The absolute value version of the torque command signal at the output of the absolute value stage 156 is applied to the input of an electronic switch 158. As is discussed below, electronic switch 158 is part of the present invention. Electronic switch 158 normally connects its input to a first output 159, but is adapted to connect its first output 159 to a second input 160 in response to a switch signal or idle control signal applied to a switching input 161. Electronic switch 158 can be of any suitable type, such as a bipolar transistor or field effect transistor switch or an electromechanical relay. When the first output 159 of electronic switch 158 is caused to be connected to the second input 160, the level of the torque command at the first output 159 is caused to be forced to a level corresponding to a predetermined current level, whereby the magnitude of the drive current is forced to a predetermined level.

The first output 159 is applied to the first input of a summer 162 of conventional design. A shunt 168 is mounted to sense the magnitude of the DC current ($I_{DC}$) at the side of inductor 30 connected to inverter 14. Shunt 168 provides on a line 169 a signal indicative of this magnitude level. The signal on line 169 is negatively fed back and provided to a second input of summer 162. The output of summer 162 provides to an input 48 of a current control stage 50 a signal representative of the difference between the absolute value version of the torque command signal and the signal indicative of the magnitude of the DC current ($I_{DC}$).

Current control stage 50 can be of any suitable type for generating the current control signal on line 26 in accordance with the signal at input 48. One suitable form for current control stage 50 is that of a ramp and pedestal gating control of conventional design.

The torque command signal on line 166 is also applied to the first input of a summer 170 of conventional design. The actual rotation signal is positively fed back and provided to a second input of summer 170. The output of summer 170, which is a signal proportional to the sum of the torque command signal and the actual rotation signal, is provided to the input of an electronic switch 172. Electronic switch 172 is part of the present invention. Switch 172 normally connects the the output of summer 170 to its output, but is adapted to connect the output of a high frequency reference signal source when a frequency command signal or an idle control signal is provided by a line 173 to its switching input 174. Electronic switch 172 can be of any suitable type, such as a bipolar or field effect transistor switch or an electromechanical relay. As is discussed in detail below, when switch 172 is caused to connect its output to the high frequency reference signal source, the signal at its output is effective to cause a frequency control stage 54 to force inverter 14 to raise the frequency of the drive current to a higher frequency value in order to produce the desired high slip.

The output of electronic switch 172 is connected to an input 52 of frequency control stage 54. Frequency control stage 54 can be of any suitable type for generating the frequency control signal as a function of its input, which for the normal operations discussed above is the signal proportional to the sum of the torque command signal and the actual rotation signal. The frequency control signal is provided to inverter 14 via line 20. One suitable form for frequency control stage 54 is that of a voltage controlled oscillator and a non-recirculating shift register disclosed and claimed in U.S. Pat. No. 4,258,416 entitled "Inverter Power Conversion System Having Improved Control Scheme," to Loren H. Walker et al, issued Mar. 24, 1981, assigned to the assignee of the present application, and incorporated herein by reference. Another suitable form for frequency control stage 54 is that of a voltage controlled oscillator and a ring counter.

The drive system shown in FIG. 6 allows the mechanical rotation and torque generated by AC induction motor 18 to be controlled in accordance with the desired level of rotation. FIG. 8 plots on five separate graphs important drive system parameters as the drive current causes motor 18 to enter, stop, and exit the substantially zero rotation and substantially zero torque mode at high slip.

The horizontal axis of each of the graphs 8A-8E represents an identical time period in the drive system operation, where the time period to the left of symbol T1 represents the drive system supplying drive current to motor 18 causing it to enter the conventional substantially zero rotation and substantially zero torque mode where the frequency of the drive current is substantially zero. The time period between symbols T1 and T2 represents the time period in which the drive system supplies drive current causing motor 18 to remain in the substantially zero rotation and substantially zero torque mode at moderate current magnitude and high slip; the time period to the right of symbol T2 represents the time period where the drive system supplies drive current causing motor 18 to exit and accelerate out of the substantially zero rotation and substantially zero torque high slip mode.

Graph 8A plots on the vertical axis the level of the actual rotation signal. It is seen that the actual rotation signal is approximately zero when the drive system causes motor 18 to stop in the substantially zero rotation and substantially zero torque high slip mode.

Graph 8B plots on the vertical axis the level of the torque command signal, which is approximately zero when the drive system causes motor 18 to stop in the substantially zero rotation and substantially zero torque high slip mode.

Graph 8C plots on the vertical axis the level of the torque generated by motor 18, which is approximately zero when the drive system causes motor 18 to stop in the substantially zero rotation and substantially zero torque high slip mode.

Graph 8D plots on the vertical axis the level of the motor stator current for one winding of polyphase motor 18. Graph 8D shows that this stator current is at high frequency, moderate magnitude level when motor 18 is in the substantially zero rotation and substantially zero torque high slip mode.

An idle control signal is furnished in the electric motor drive system of FIG. 6 when the system is in the conventional substantially zero rotation and substantially zero torque mode where the frequency of the drive current is substaantially zero. An apparatus and method for furnishing the idle control signal is disclosed in U.S. patent application Ser. No. 32,855 now U.S. Pat. No. 4,287,463 entitled "Zero Rotation and Zero Torque Detector and Method for an AC Electric Motor Drive," to Loren H. Walker and John H. Cutler, filed the same day as the present application assigned to the assignee of the present invention, and incorporated by reference herein.

In the case of a drive system utilizing a desired level of rotation, the idle control signal is furnished when the torque command signal and at least two of the rotation reference signal, the actual rotation signal, and the rotation difference signal are less than respective predetermined values. Alternately, in the case of a drive system utilizing a desired level of torque as shown in FIG. 9, the idle control signal is furnished when the actual rotation signal and the torque reference signal are less than respective predetermined values.

Graph 8E plots on the vertical axis the presence of the idle control signal. The idle control signal is in the low state when the drive system is not in the substantially zero rotation and substantially zero torque high slip mode, and goes to the high state when the system enters the conventional substantially zero rotation and substantially zero torque condition.

Referring again to FIG. 6, a preferred embodiment of the apparatus of the present invention is shown for a drive system employing a desired level of rotation. An absolute magnitude circuit 100 has an input connected via line 102 to the torque command signal on line 46. Absolute magnitude circuit 100 can be of any suitable type for providing on an output line 104 an absolute magnitude version of the torque command signal.

The absolute magnitude version of the torque command signal is provided to a first input of a voltage comparator 106, whose second input is connected to a source of reference voltage 108. The level of the reference voltage corresponds to the respective predetermined value below which the absolute magnitude version of the torque command signal must have in order for the system to be in the substantially zero rotation and substantially zero torque mode. Reference voltage source 108 can be of any suitable type for generating a reference voltage at the predetermined value.

Voltage comparator 106 can be of any suitable form for furnishing a first output signal on line 110 when the absolute magnitude version of the torque command signal is less than the level of reference voltage source 108. One suitable form for voltage comparator 106 is that of an operational amplifier connection in the voltage comparison mode.

The input of a second absolute magnitude circuit 112 is connected via a line 114 to the actual rotation signal on line 34 for providing an absolute magnitude version of the actual rotation signal on an output line 116. Absolute magnitude stage 112 can take any suitable form. The absolute magnitude version of the actual rotation signal on line 116 is provided to a first input of a voltage comparator 118. The second input of comparator 118 is connected to reference voltage source 108, and provides at an output 120 a second output signal when the magnitude of the absolute magnitude version of the actual rotation signal is less than the level of reference voltage source 108.

The input of a third absolute magnitude circuit 122 is connected via an input line 124 to the rotation reference signal at wiper arm 40. Absolute magnitude circuit 122 provides at an output line 126 an absolute magnitude version of the rotation reference signal. The absolute magnitude version of the rotation reference signal on output line 126 is supplied to a first input of a voltage comparator 128, whose second input is connected to reference voltage source 108. Comparator 128 provides on an output line 130 a third output signal when the absolute magnitude version of the rotation reference signal is less than the level of the reference voltage signal.

The input of a fourth absolute magnitude circuit 180 is connected via a line 182 to the rotation difference signal at the output of summer 42 for providing an absolute magnitude version of the rotation difference signal on an output line 184. Absolute magnitude stage 180 can take any suitable form. The absolute magnitude version of the rotation difference signal on line 184 is provided to a first input of a voltage comparator 186. The second input of comparator 186 is connected to reference voltage source 108, and provides at an output 190 a fourth output signal when the magnitude of the absolute magnitude version of the rotation difference signal is less than the level of reference voltage source 108.

It should be understood that voltage comparators 106, 118, 128 and 186 each could be connected to a different reference signal source providing reference signals of different levels. The use of different reference sources is one way to provide for different predetermined levels below which the torque command signal and at least two of the rotation reference signal, the actual rotation signal, and the rotation difference signal must be in order for the idle control signal to be furnished.

As shown, the output signals from voltage comparators 106, 118, 128 and 186 on lines 110, 120, 130 and 190, respectively, are applied to a logic circuit 140, which furnishes the idle control signal only when the first control signal and two of the second to fourth control signals are present. It should be understood that the present invention can also be configured to provide the idle control signal when each of the first to fourth control signals are present. Normally, only two of the second to fourth control signals are used, however, because the information in the unused control signal is present in the two control signals that are used. Logic circuit 140 can be of any suitable type, such as an AND gate or a NAND gate. The output from logic circuit 140 on line 142 is the idle control signal, and indicates that the drive system is in the substantially zero rotation and substantially zero torque mode of operation.

A delay of predetermined time amount can be introduced before furnishing of the idle control signal to prevent the idle control signal from being generated transiently when the drive system momentarily passes through the conventional substantially zero rotation and substantially zero torque mode. This delay of a predetermined time amount can be produced by applying the idle control signal on line 142 to a delay stage 144 which can be of any suitable design, e.g., a one shot and a gate. Delay stage 144 has a delay on rise and no delay on fall, for example, 0.1 second on rise.

The idle control signal on output line 150 of delay stage 144 causes three functions as represented by block 148. Block 148 represents the three functions produced by the signal on line 150. In structure, block 148 may be nothing more than three lines to conduct the signal on line 150 to the three switches as shown.

The first function represented by block 148 is to provide a switching signal, i.e., the idle control signal on line 173 to electronic switch 172 effectively to cause the frequency of the drive current to be rapidly raised to a higher frequency value (in accordance with the signal provided by the high frequency reference source) to produce the desired high per-unit slip. The idle control signal on line 173 can cause frequency control stage 54 effectively to raise the frequency of the drive current to a preselected higher frequency value in accordance with the signal provided by the high frequency reference source, or can cause the frequency control stage to generate a higher frequency value to produce the per-unit slip greater than 0.1. In either case, the idle control signal on line 173 to electronic switch 172 causes switch 172 to provide the signal from the high frequency reference source to input 52 of control stage 54, effectively causing frequency control stage 54 to raise the frequency of the drive current to produce the desired per-unit slip greater than 0.1. A suitable value for the higher frequency value is 12 Hz, when the maximum frequency supplied by converter 14 is 60 Hz.

The second function represented by block 148 is to provide a switching signal, i.e., the idle control signal, on a line 176 to electronic switch 158 effectively to cause the magnitude of the drive current to be rapidly changed to a predetermined magnitude level determined by the predetermined current level. The idle control signal on line 176 for rapidly changing the magnitude of the current can cause current control stage 50 arbitrarily to change the current to a preselected magnitude level in accordance with the predetermined current level. The predetermined magnitude level, as stated above, causes the level of the voltage on the commutating capacitors in the inverter to be maintained at a desired level.

In another aspect of the apparatus and method of the present invention, a third function represented by block 148 can be included which provides a switching signal, i.e., an idle control signal, on a line 177 to electronic switch 164, causing switch 164 to close so as to reduce rapidly the torque command signal to substantially zero. As is seen in FIG. 6, this reduction to substantially zero is due to electronic switch 164 grounding line 166. The reduction of the torque command signal to zero when the drive system is in the substantially zero rotation and substantially zero torque high slip mode prevents sudden transients in drive system performance from occurring when the drive system exits this mode.

As is apparent, the present invention can produce the desired high slip condition of the motor in the substantially zero rotation and substantially zero torque mode using other forms of control signalling and using different types of AC electric motor drive systems.

Referring to FIG. 9, a preferred embodiment of the apparatus and method of the present invention for use in an AC electric motor drive system employing a desired level of torque command is shown within a dashed-line box 200. The conventional AC electric motor drive system employing a desired level of torque command shown in FIG. 9 is outside of dashed-line box 200, and is similar to the drive system disclosed in the Espelage et al patent, U.S. Pat. No. 4,230,979, discussed above. Like numbers in FIGS. 6 and 9 correspond to identical components; only different components are discussed herein.

A torque reference signal proportional to a desired level of torque is provided on a line 300. This torque reference signal can be provided by the drive system, or can be furnished by an operator settable rheostat 302 having a wiper arm 304. The position of wiper arm 304 corresponds to the desired level of torque indicated by the position of a user torque lever (not shown).

The torque reference signal is provided as an input of a torque regulator 306, which generates the torque command signal on line 46 as a function of the torque reference signal. Torque regulator 306 can be of any suitable type to generate the torque command signal in accordance with the torque reference signal. One suitable form for torque regulator 306 is an operational amplifier of conventional design configured to operate as an amplifier exhibiting a suitable gain.

In the drive system employing a desired level of torque, the idle control signal is furnished when the actual rotation signal and the torque reference signal are less than respective predetermined values. The respective predetermined values can be different for the torque command signal and the actual rotation signal, but the values indicate when the drive system is in the conventional substantially zero rotation and substantially zero torque mode when the frequency of the drive current is of a very low value so as to produce the constant slip mode of operation.

Referring again to FIG. 9, the actual rotation signal is applied via line 322 to an absolute magnitude circuit 320. Absolute magnitude circuit 320 can be any suitable type for providing on an output line 324 an absolute magnitude version of the actual rotation signal.

The absolute magnitude version of the actual rotation signal is applied to the first input of a voltage comparator 326. A second input of voltage comparator 326 is connected to a reference voltage source 328, which provides a reference signal at a value equal to the respective predetermined value. Voltage comparator 326 provides a second output signal when the absolute magnitude version of the actual rotation signal is less than the predetermined value. Voltage comparator 326 can be of any suitable type, for example, an operational amplifier connected in the voltage comparison mode. An alternative shown on FIG. 9 uses the signal at line 171 rather than the actual rotation at line 34 via dot-dash line 308 as the input to 322. The signal at line 171 is normally proportional to actual frequency rather than actual rotation.

An input line 330 of an absolute magnitude circuit 332 is connected to the torque reference signal on line 300. Absolute magnitude circuit 332 provides an absolute magnitude version of the torque command signal on a line 334 connected to the first input of a comparator 336. The second input of voltage comparator 336 is connected to reference voltage source 328. Voltage comparator 336 generates a first output signal when the value of the absolute magnitude version of the torque command signal is less than the reference voltage signal equal to the respective predetermined value furnished by reference voltage source 328. Voltage comparator 336 can be of any suitable type, for example, an operational amplifier connected in the voltage comparison mode.

The first output signal from comparator 336 and the second output signal from voltage comparator 326 are applied to a logic circuit 340, which provides the idle control signal as an output on line 342 when both of the two output signals are in the high state. Logic stage 340 can be of any suitable type for providing the idle control signal when each of the two output signals are in the high state, for example, an AND gate or a NAND gate.

As in the case of the embodiment shown in FIG. 6, the idle control signal at output 346 of delay stage 344 causes three functions to be produced by block 348. It should be noted that the idle control signal without delay can be provided by line 342 directly to block 348 which similarly to block 148 in FIG. 1 may be only a function representation block.

The first function produced by block 348 is to provide a switching signal, i.e., the idle control signal on line 173 to electronic switch 172 effectively to cause the frequency of the drive current to be raised rapidly to a higher frequency value in accordance with the signal provided by the high frequency reference source to produce the desired high per-unit slip. The idle control signal on line 173 can cause frequency control stage 54 effectively to raise the frequency of the drive current to a preselected higher frequency value in accordance with the signal provided by the high frequency reference source, or can cause the frequency control stage to generate a higher frequency value to produce the per-unit slip greater than 0.1. In either case, the idle control signal supplied on line 173 to electronic switch 172 causes switch 172 to provide the signal from the high frequency reference source to input 52 of control stage 54, effectively causing frequency conrol stage 54 to raise the frequency of the drive current to produce the desired per-unit slip greater than 0.1. A suitable value for the higher frequency value is 12 Hz, when the maximum frequency supplied by converter 14 is 60 Hz.

The second function produced by block 348 is to provide a switching signal, i.e., the idle control signal, on a line 176 to electronic switch 158 effectively to cause the magnitude of the drive current to be rapidly changed to a predetermined magnitude level determined by the predetermined current level. The idle control signal on line 176 for rapidly changing the magnitude of the current can cause current control stage 50 arbitrarily to change the current to a preselected magnitude level in accordance with the predetermined level. The predetermined magnitude level, as stated above, causes the level of the voltage on the commutating capacitors in the inverter to be maintained at a desired level.

In another aspect of the apparatus and method of the present invention, a third function can be produced by block 348 when it provides a switching signal, i.e., an idle control signal on a line 177 to electronic switch 164, causing switch 164 to close so as to reduce rapidly the torque command signal to substantially zero. As is seen in FIG. 6, this reduction to substantially zero is due to electronic switch 164 grounding line 166. The reduction of the torque command signal to zero when the drive system is in the substantially zero rotation and substantially zero torque high slip mode prevents sudden transients in drive system performance from occurring when the drive system exits this mode.

While there have been shown and described what is at present considered to be the preferred embodiments of the present invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

What is claimed is:

1. A substantially zero rotation and substantially zero torque apparatus for an AC electric motor drive system having an AC electric motor producing a rotation in response to a drive current of variable magnitude and frequency comprising:
   (a) means for establishing a rotation reference signal proportional to a desired level of motor rotation;
   (b) means for generating an actual rotation signal proportional to the rotation of the motor;
   (c) means for generating a rotation difference signal as a function of any difference between said rotation reference signal and said actual rotation signal;
   (d) means for supplying a torque command signal in accordance with said rotation difference signal, and for producing a frequency control signal and a current control signal as functions of said torque command signal;
   (e) means for supplying drive current to the motor at a frequency controlled in response to said frequency control signal and at a magnitude varied in accordance with said current control signal;
   (f) means for furnishing an idle control signal when said torque command signal and at least two of said rotation reference signal, said actual rotation signal, and said rotation difference signal are less than respective predetermined values; and
   (g) first and second modifying means each responsive to said idle control signal for, respectively, changing the magnitude and rapidly raising the frequency of the drive current to cause the motor to produce a substantially zero rotation and substantially zero torque at high slip.

2. The apparatus of claim 1, further including a third modifying means responsive to said idle control signal for rapidly adjusting the magnitude of said torque command signal to an arbitrary level.

3. The apparatus of claim 1 wherein said high slip has a per-unit value greater than or equal to 0.1.

4. The apparatus of claim 2, wherein said arbitrary level is substantially zero.

5. The apparatus of claim 1, wherein said means for furnishing an idle control signal further includes means for delaying by a predetermined time amount generation of said idle control signal.

6. The apparatus of claim 1, wherein said predetermined time amount is approximately 0.1 second.

7. The apparatus of claim 1, wherein said first modifying means comprises an electronic switch operable to cause said means for supplying a torque command signal to produce said current control signal as a function of said torque command signal in the absence of said idle control signal and operable in response to the presence of said idle control signal to cause said means for supplying a torque command signal to produce said current control signal at a selected magnitude.

8. The apparatus of claim 1, wherein said second modifying means comprises an electronic switch operable to cause said means for supplying a torque command signal to produce said frequency control signal as a function of said torque command signal in the absence of said idle control signal and operable in response to the presence of said idle control signal to cause said means for supplying a torque command signal to produce said frequency control signal at a reference level.

9. The apparatus of claim 1, wherein said first modifying means, in response to said idle control signal, effects changes in said magnitude of said drive current to a per-unit value less than or equal to 0.3.

10. The apparatus of claim 1, wherein said second modifying means, in response to said idle control signal, effects a rapid rise in the frequency of said drive current to a value greater than or equal to 10 Hz.

11. The apparatus of claim 1, wherein said means for supplying to said motor said drive current comprises:
   (a) a variable DC current source for providing a DC output current having a magnitude varied in response to said current control signal;
   (b) an inverter for supplying said drive current to said motor at a frequency controlled as a function of said frequency control signal; and
   (c) link circuit means including an inductor for connecting said DC current source to said inverter.

12. The apparatus of claim 1, wherein said means for generating an actual rotation signal includes means to generate a signal proportional to the frequency of said drive current.

13. A substantially zero rotation and substantially zero torque apparatus for an AC electric motor drive system having an AC electric motor producing a rotation in response to a drive current of variable magnitude and frequency comprising:
(a) means for establishing a torque reference signal proportional to a desired level of motor torque;
(b) means for generating an actual rotation signal proportional to motor rotation;
(c) means for generating a torque command signal as a function of said torque reference signal, and for producing a frequency control signal and a current control signal as functions of said torque command signal;
(d) means for supplying drive current to said motor at a frequency controlled in response to said frequency control signal and at a magnitude varied in accordance with said current control signal;
(e) means for furnishing an idle control signal when said torque reference signal and said actual rotation signal are less than respective predetermined values; and
(f) first and second modifying means each responsive to said idle control signal for, respectively, changing the magnitude and rapidly raising the frequency of said drive current to cause the motor to produce a substantially zero rotation and substantially zero torque at high slip.

14. The apparatus of claim 13, wherein said means for furnishing an idle control signal further includes means for delaying by a predetermined time amount generation of said idle control signal.

15. The apparatus of claim 13, wherein said means for furnishing an idle control signal furnishes said idle control signal when said torque reference signal and said actual rotation signal are less than respective predetermined values.

16. The apparatus of claim 13, further including a third modifying means responsive to said idle control signal for rapidly adjusting the magnitude of said torque command signal to an arbitrary level.

17. The apparatus of claim 13, wherein said high slip has a per-unit value greater than or equal to 0.1.

18. The apparatus of claim 13, wherein said first modifying means comprises an electronic switch operable to cause said means for supplying a torque command signal to produce said current control signal as a function of said torque command signal in the absence of said idle control signal and operable in response to the presence said idle control signal to cause said means for supplying a torque command signal to produce said current control signal at a selected magnitude.

19. The apparatus of claim 13, wherein said second modifying means comprises an electronic switch operable to cause said means for supplying a torque command signal to produce said frequency control signal as a function of said torque command signal in the absence of said idle control signal and operable in response to the presence of said idle control signal to cause said frequency control signal to be determined by a fixed reference level.

20. The apparatus of claim 13, wherein said means for supplying to said motor drive current comprises:
(a) a variable DC current source for providing a DC output current having a magnitude varied in response to said current control signal;
(b) an inverter for supplying said drive current to said motor at a frequency controlled as a function of said frequency control signal; and
(c) link circuit means including an inductor for connecting said DC current source to said inverter.

21. The apparatus of claim 13, wherein said means for generating an actual rotation signal includes means to generate an actual rotation signal proportional to the frequency of said drive current.

22. A method of producing substantially zero rotation and substantially zero torque from an AC electric motor producing rotation and torque in response to a motor drive current of variable magnitude and frequency supplied by an AC electric motor drive system comprising the steps of:
(a) producing a motor drive current of controllable magnitude and frequency;
(b) furnishing an idle control signal when the drive system is in a substantially zero rotation and substantially zero torque state where the magnitude and frequency of said motor drive current are below preselected levels; and
(c) substantially simultaneously, in response to said idle control signal, changing the magnitude of said motor drive current to a predetermined magnitude level and raising rapidly the frequency of said motor drive current to a higher frequency value to produce a per-unit slip greater than 0.1.

23. A method of producing substantially zero rotation and substantially zero torque from an AC electric motor producing rotation and torque in response to a drive current of variable magnitude and frequency supplied by an AC electric motor drive system comprising the steps of:
(a) establishing a rotation reference signal proportional to a desired level of motor rotation;
(b) generating an actual rotation signal proportional to the motor rotation;
(c) generating a rotation difference signal as a function of any difference between said rotation reference signal and said actual rotation signal;
(d) producing a torque command signal in accordance with said rotation difference signal;
(e) producing a frequency control signal and a current control signal as functions of said torque command signal;
(f) supplying to the motor drive current at a frequency controlled in response to said frequency control signal and at a magnitude varied in accordance with said current control signal;
(g) furnishing an idle control signal when said torque command signal and at least two of said rotation reference signal, said actual rotation signal, and said rotation difference signal are less than respective predetermined values; and
(h) substantially simultaneously, in response to said idle control signal, changing the magnitude of said drive current to a preselected magnitude level and raising rapidly the frequency of said drive current to a higher frequency value to cause the motor to produce a substantially zero rotation and substantially zero torque at high slip.

24. The method of claim 23, wherein step (h) further includes adjusting rapidly, in response to said idle control signal, the magnitude of said torque command signal to an arbitrary level.

25. A method of producing substantially zero rotation and substantially zero torque from an AC electric motor producing rotation and torque in response to a drive current of variable magnitude and frequency supplied by an AC electric motor drive system comprising the steps of:

(a) establishing a torque reference signal proportional to a desired level of motor torque;

(b) generating an actual rotation signal proportional to motor rotation;

(c) generating a torque command signal as a function of said torque reference signal;

(d) producing a frequency control signal and a current control signal as functions of said torque command signal;

(e) supplying to the motor drive current at a frequency controlled as a function of said frequency control signal and at a magnitude varied in accordance with said current control signal;

(f) furnishing an idle control signal when said actual rotation signal and said torque reference signal are less than respective predetermined values;

(g) substantially simultaneously, in response to said idle control signal, changing the magnitude of said drive current to a lower preselected magnitude level and raising rapidly the frequency of said drive current to a higher frequency value to cause the motor to produce a substantially zero rotation and substantially zero torque at high slip.

26. In a drive system for controlling the operation of an AC electric motor, apparatus for effecting a mode of motor operation at substantially zero rotation and substantially zero torque comprising:

(a) means for developing an outgoing signal of controllable magnitude and controllable frequency, said outgoing signal acting to supply electrical power to the motor;

(b) means for furnishing a command for placing the motor in a substantially zero rotation and substantially zero torque mode of operation;

(c) means for furnishing an idle control signal in response to said command;

(d) first modifying means responsive to said idle control signal for changing the magnitude of said outgoing signal to a predetermined magnitude level; and, (e) second modifying means responsive to said idle control signal for rapidly raising the frequency of said outgoing signal to a higher frequency to effect, in said motor, a pre-unit slip of greater than a predetermined value.

27. The invention in accordance with claim 26, wherein said second modifying means acts to effect, in said motor, a per-unit slip of greater than 0.1.

28. The invention in accordance with claim 26 wherein said means for developing an outgoing signal develops as said outgoing signal, a drive current for the motor.

29. The invention in accordance with claim 26 further including:

(a) means to sense a substantially zero rotation state of the motor and to produce a first signal indicative of such state; and (b) means to sense a substantially zero frequency state of said outgoing signal and to produce a second signal indicative of such state; and, wherein said means for furnishing said idle control signal is further responsive to at least a one of said first and second signals.

* * * * *